(12) United States Patent
Foley (10) Patent No.: US 6,408,084 B1
(45) Date of Patent: Jun. 18, 2002

(54) METHOD FOR SORTING DOCUMENTS (75) Inventor: James E. Foley, Easton, CT (US)

(73) Assignee: Agissar Corporation, Stratford, CT (US)

( * ) Notice: Subject to any disclaimer, the term of this patent is extended or adjusted under 35 U.S.C. 154(b) by 0 days.

(21) Appl. No.: 09/571,775

(22) Filed: May 16, 2000

Related U.S. Application Data (63) Continuation-in-part of application No. 09/229,815, filed on Jan. 13, 1999.

(51) Int. Cl.$^7$ .................................................. G06K 9/00
(52) U.S. Cl. ........................ 382/101; 382/100; 209/584; 209/900
(58) Field of Search ................................ 382/101, 141, 382/137; 209/3, 584, 548, 900; 705/401

(56) References Cited

U.S. PATENT DOCUMENTS

| 3,266,626 A | 8/1966 | Simjian | 209/545 |
|---|---|---|---|
| 3,295,139 A | 12/1966 | Simjian | 131/334 |
| 3,538,338 A | 11/1970 | Rabinow | 250/568 |
| 3,791,516 A | 2/1974 | Tramposch | 209/539 |
| 3,904,516 A | 9/1975 | Chiba et al. | 209/556 |
| 4,013,999 A | 3/1977 | Erwin et al. | 382/101 |
| 4,205,780 A | 6/1980 | Burns et al. | 235/454 |
| 4,326,636 A | 4/1982 | Kawakami | 209/534 |
| 4,542,829 A | 9/1985 | Emery et al. | 209/534 |

(List continued on next page.)

FOREIGN PATENT DOCUMENTS

| DE | 258895 | 10/1912 |
|---|---|---|
| DE | 3821106 | 1/1989 |
| EP | 36149 | 9/1981 |
| EP | 215469 | 3/1987 |
| EP | 440129 | 8/1991 |
| EP | 447581 | 9/1991 |
| JP | 54-01100 | 1/1979 |
| JP | 1-209247 | 8/1989 |
| JP | 63-319180 | 12/1998 |

OTHER PUBLICATIONS

Electronic Industries, Jul. 1958, pp. 56–60.
Toshiba Review No. 118, Nov.–Dec. 1978, pp. 5–10.

Primary Examiner—Leo Boudreau
Assistant Examiner—M B Choobin
(74) Attorney, Agent, or Firm—St. Onge Steward Johnston & Reens, LLC (57) ABSTRACT A system for sorting documents is provided. The system first automatically determines the physical orientation of each document. Each document may have one of the following four orientations: face-forward and right-side-up, face-forward and up-side-down, face-backward and right-side-up and face-backward and up-side-down. Once the physical orientation of each document is determined, each document is sorted by orientation to one of four document bins corresponding to each of the four orientations described above. Preferably, a digital image of each document is captured before being sorted to the appropriate bin, and most preferably, the digital image of each document is automatically oriented to a preferred orientation. Preferably, each document includes visually readable markings, and the physical orientation of each document is automatically determined based upon the visually readable markings. Alternately, it is preferable that each document includes magnetically readable markings, and the physical orientation of each document is automatically determined based upon the magnetically readable markings. The method is particularly well suited to be used with checks and bill heads. In such a case, the physical orientation of the check is determined, and then the check is sorted to an appropriate bin based upon this orientation. The bill head accompanying the check is also sorted to an appropriate bin based upon the check's orientation.

12 Claims, 6 Drawing Sheets

U.S. PATENT DOCUMENTS

| | | | |
|---|---|---|---|
| RE32,328 E | 1/1987 | Russell | 206/541 |
| 4,741,047 A | 4/1988 | Sharpe, II | 382/306 |
| 4,863,037 A | 9/1989 | Stevens et al. | 53/381.3 |
| 4,934,892 A | 6/1990 | Smith et al. | 414/412 |
| 4,940,144 A * | 7/1990 | Barbour | 206/610 |
| 4,993,556 A | 2/1991 | Gerlier | 209/534 |
| 4,993,700 A | 2/1991 | Winkler | 271/186 |
| 5,020,110 A | 5/1991 | Chominski | 382/137 |
| 5,025,475 A | 6/1991 | Okabe | 382/101 |
| 5,036,190 A | 7/1991 | Lile et al. | 250/223 R |
| 5,052,168 A | 10/1991 | DeWitt et al. | 53/492 |
| 5,054,620 A | 10/1991 | DeWitt et al. | 209/3.1 |
| 5,115,918 A | 5/1992 | DeWitt et al. | 209/3.1 |
| 5,240,116 A | 8/1993 | Stevens et al. | 209/534 |
| 5,277,321 A | 1/1994 | Nagasawa et al. | 209/583 |
| 5,293,431 A | 3/1994 | Hayduchok et al. | 382/101 |
| 5,295,196 A | 3/1994 | Raterman et al. | 382/135 |
| 5,310,062 A | 5/1994 | Stevens et al. | 209/584 |
| 5,386,482 A | 1/1995 | Basso et al. | 302/101 |
| 5,397,003 A | 3/1995 | Stevens et al. | 209/553 |
| 5,439,118 A * | 8/1995 | York | 209/553 |
| 5,441,159 A | 8/1995 | DeWitt et al. | |
| 5,444,794 A | 8/1995 | Uhland, Sr. | 705/45 |
| 5,460,273 A | 10/1995 | Stevens et al. | 209/584 |
| 5,464,099 A | 11/1995 | Stevens et al. | 209/3.1 |
| 5,467,406 A | 11/1995 | Graves et al. | 382/135 |
| 5,506,691 A | 4/1996 | Bednar et al. | 382/402 |
| 5,518,121 A | 5/1996 | Stevens et al. | 209/1 |
| 5,540,338 A | 7/1996 | Stevens et al. | 209/534 |
| 5,558,232 A | 9/1996 | Stevens et al. | 209/584 |
| 5,649,026 A | 7/1997 | Heins, III | 382/175 |
| 5,649,628 A | 7/1997 | Stevens et al. | 209/534 |
| 5,671,440 A * | 9/1997 | Curry | 395/828 |
| 5,673,333 A * | 9/1997 | Johnston | 382/137 |
| 5,842,577 A * | 12/1998 | Stevens et al. | 209/3 |
| 5,970,166 A * | 10/1999 | Nichani | 382/141 |

* cited by examiner

METHOD FOR SORTING DOCUMENTS

CLAIM OF PRIORITY

This application is a continuation-in-part of copending U.S. patent application Ser. No. 09/229,815 filed Jan. 13, 1999.

FIELD OF THE INVENTION

The invention relates to a system for sorting documents, and more specifically to a system which determines the orientation of a document and sorts the document according to its orientation.

BACKGROUND OF THE INVENTION

Frequently, when a document has to be read, either manually or by machine, the document must first be given a proper orientation. For instance, when a check is received in a mailed envelope, the check may have one of four orientations within the envelope—if not properly oriented, it can be upside-down, backwards, or both. Thus, documents must typically be sorted according to orientation before they are read. First, the orientation of the each document is determined. Then each document is reoriented to a desired orientation, if necessary, such that it can be read. Orienting each document may include sorting each document according to its orientation. The process of having to orient the document before reading it can make the associated machinery more expensive to produce and maintain.

The Opex 150, a sorter distributed by Opex Corporation of Moorestown, N.J., operates using the above process. The machinery opens an envelope, removes one or more documents from the envelope, determines its orientation, routes the document according to its orientation, and then physically manipulates the document so that it is positioned in a predetermined "correct" orientation. The document can then be read.

Japanese Patent No. 1-209247 to Nakano discloses a similar automatic sorter for mail. Using a video camera, the device scans a letter to determine which orientation the letter has. Based upon this determination, the sorter first sorts the letters into four possible orientations and then physically manipulates the letters such that the letters end up in the same orientation. The letters are then read.

A disadvantage of both the Opex 150 and the Nakano apparatuses is that documents must be physically reoriented before they can be read. Such physical reorientation requires machinery which is expensive, complex and difficult to maintain.

U.S. Pat. No. 5,293,431 to Hayduchok et al. discloses a system for orienting documents in the automated processing of bulk mail and the like. The system acquires a digital image of both sides of a document. From these images, the system determines the orientation of the document by analyzing the pixels of the image at preselected areas of the document. The document is then reoriented for further processing if necessary. As with the above systems, a disadvantage of this system is that the document must be physically reoriented before it can be processed.

U.S. Pat. No. 5,293,431 to Stevens et al. discloses a method for automated mail extraction and remittance processing. The disclosed method involves presenting to an operator only the documents of windowed envelopes in which the checks are oriented in the same manner as the coupon, while removing the other documents from the processing path. Disadvantageously, this method only can be used with windowed envelopes.

What is desired, therefore, is system for sorting documents which determines the orientation of a document and sorts the document according to its orientation, which can sort sets of documents, each set comprising a check and a coupon, and which sorts documents without requiring that the documents be physically reoriented before the information on the documents is read.

SUMMARY OF THE INVENTION

Accordingly, an object of the invention is to provide a system for sorting documents which determines the orientation of a document and sorts the document according to its orientation.

It is another object of the invention to provide a system for sorting documents having the above characteristics and which can sort sets of documents, each set comprising a check and a coupon.

It is yet another object of the invention to provide a system for sorting documents having the above characteristics and which sorts documents without requiring that the documents be physically reoriented before the information on the documents is read.

These objects of the invention are achieved by provision of a method for sorting documents which automatically determines the physical orientation of each document. Each document may have one of the following four orientations: face-forward and right-side-up, face-forward and up-side-down, face-backward and right-side-up and face-backward and up-side-down. Once the physical orientation of each document is determined, each document is sorted by orientation to one of four document bins corresponding to each of the four orientations described above.

Preferably, a digital image of each document is captured before being sorted to the appropriate bin, and most preferably, the digital image of each document is automatically oriented to a preferred orientation. Preferably, each document includes visually readable markings, and the physical orientation of each document is automatically determined based upon the visually readable markings. Alternately, it is preferable that each document includes magnetically readable markings, and the physical orientation of each document is automatically determined based upon the magnetically readable markings.

The above method is particularly well suited to be used with checks and bill heads. In such a case, the physical orientation of the check is determined, and then the check is sorted to an appropriate bin based upon this orientation. The bill head accompanying the check is also sorted to an appropriate bin based upon the check's orientation.

DETAILED DESCRIPTION OF THE INVENTION

Figure 1:
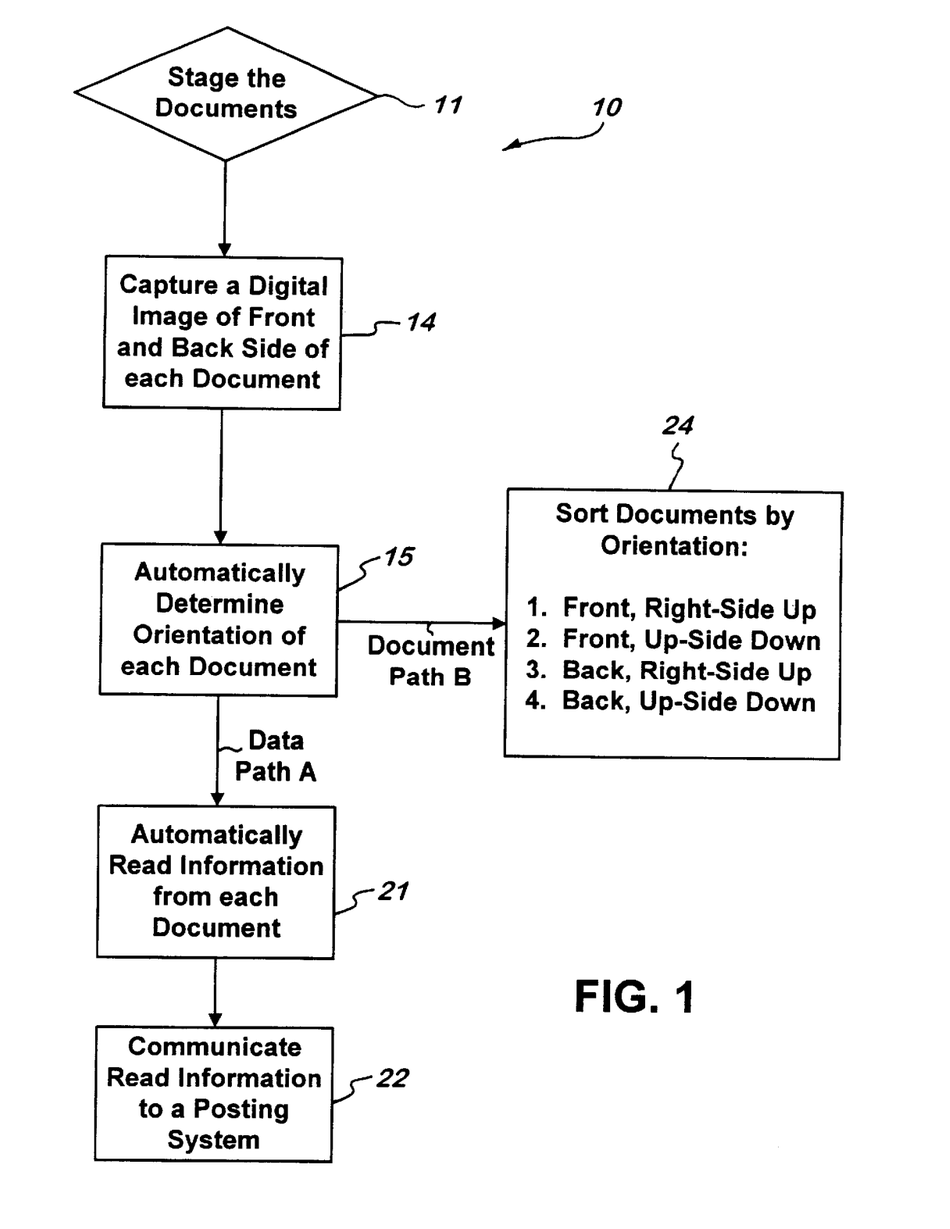
FIG. 1 is a flowchart illustrating a method for reading and sorting documents in accordance with one aspect of the present invention.
Figure 2:
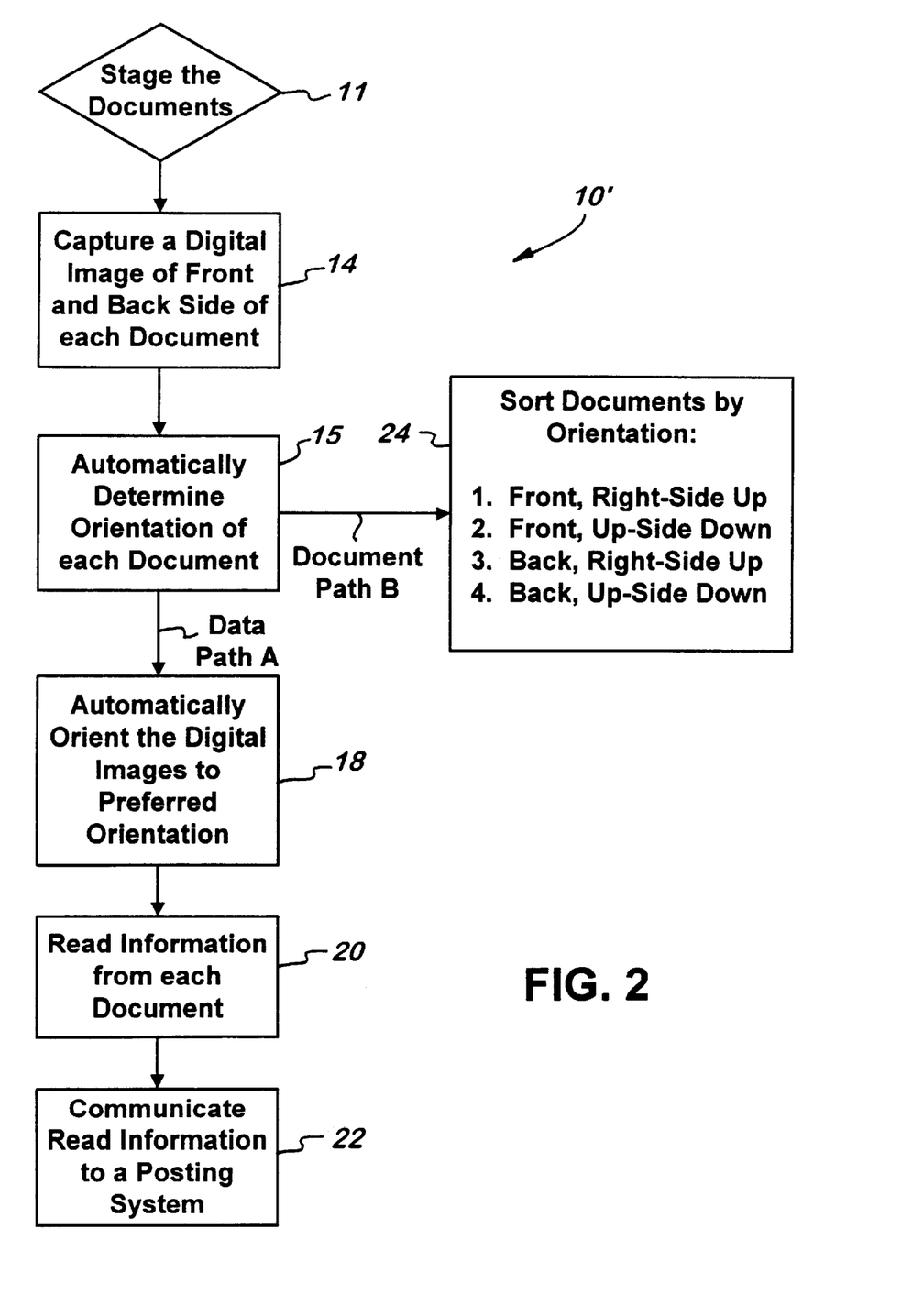
FIG. 2 is a flowchart illustrating a second embodiment of the method of FIG. 1.
Figure 3:
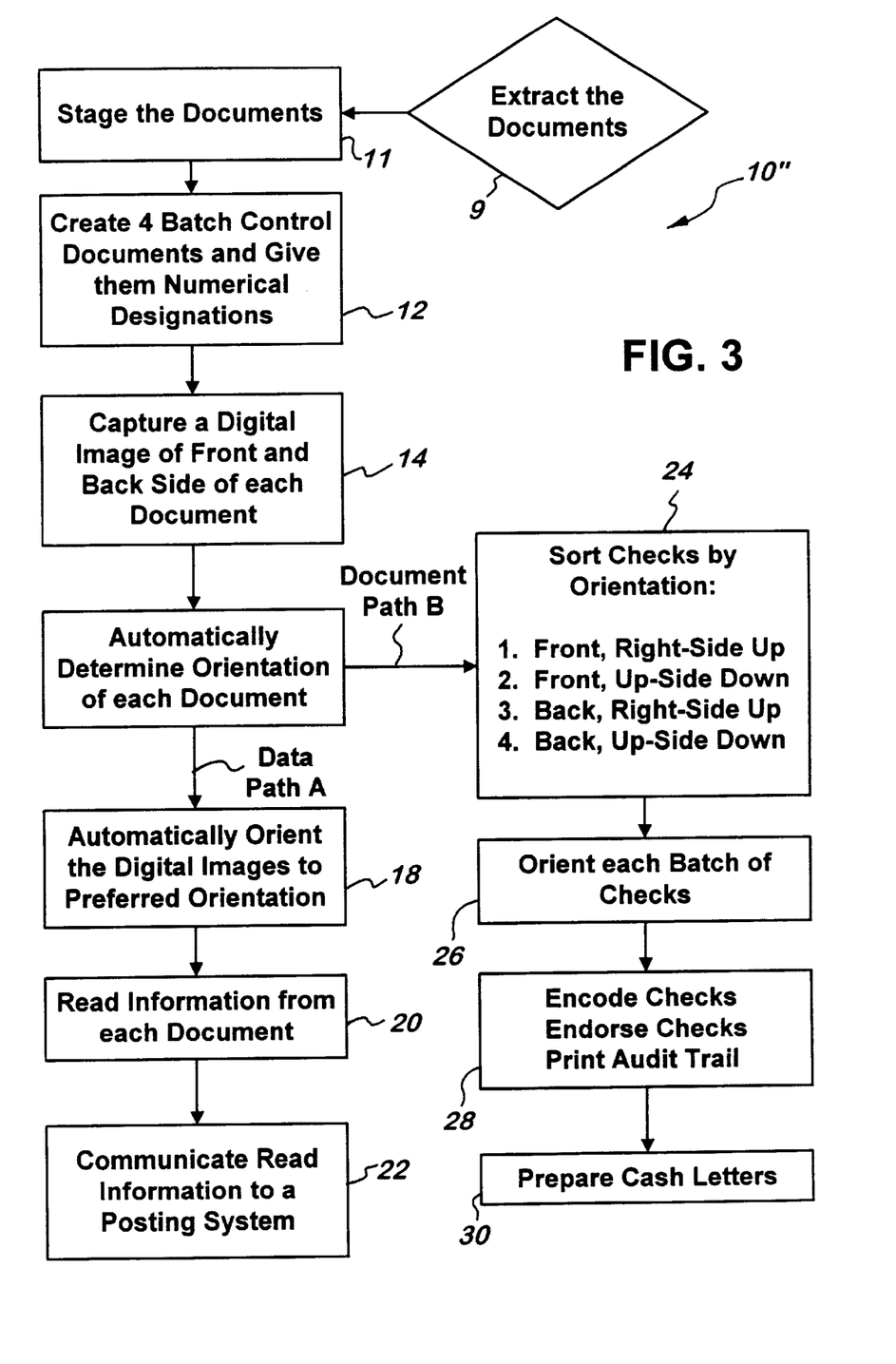
FIG. 3 is a flowchart illustrating a third embodiment of the method of FIG. 1, showing the case where the documents include checks and coupons.

Methods for reading and sorting documents 10, 10', 10" such as checks and coupons in accordance with the invention are shown in FIGS. 1–3. These methods may be used with a wide variety of documents such as checks, coupons, statements, bank notes and other writings having an orientation that is preferred.

First, if the documents are in an envelope, the documents are extracted, at 9, from the envelope (FIG. 3). The mail extraction process may begin with receiving the incoming envelopes and opening them, either automatically or manually. The envelopes that contain the documents may come from the United States Postal Service or some other source. Next, the envelopes can be sorted using automated equipment. The desired sorting preferences may take into account the thickness of the envelope contents, the presence of staples or paper clips, whether or not a check or coupon is folded, and the size and type of the envelope. The orientation of the envelopes is an optional sorting preference at this point of the process.

Opening the envelopes and extracting the documents can be performed manually or it can be performed automatically. Preferably, larger operations will use some type of automated equipment, such as the automatic contents extractor distributed by Aggisar Corporation of Stratford, Conn., assignee of the present application, under the trademark ACE. Smaller operations may prefer to do this task manually. Reorienting the documents is unnecessary at this point of the process.

The documents then are staged for processing, at 11, on a transport. Following the staging of the documents on a transport, the system captures a digital image, at 14, of the front and back of each document using a digital camera or other mechanism for capturing the image. The system then uses software to automatically determine, at 15, the physical orientation of the document. The system may further or otherwise use hardware-based codeline reading devices, such as OCR and MICR, to assist in automatically determining the physical orientation of each document. When processing checks and attendant coupons, the orientation of each coupon and check is determined based upon the orientation of each coupon's optical character scanline and each check's magnetic ink character codeline.

After determining the orientation of the captured images of the documents, the system undertakes two separate operations. The first operation (Path A) involves the processing of data captured from the document, while the second operation (Path B) involves the physical handling of the document. In the first operation (Path A), the system reads, at 20, and communicates, at 22, the information found on the documents. In the case of checks and coupons, typical information read is the customer account, the checking account number, the amount of the check, the date and a wide variety of other information. In the second operation (Path B), the method sorts the documents at 24. In a second embodiment of the invention (See FIG. 2), the method for the first operation (Path A) further automatically orients the digital image of the document before the document is read. In a third embodiment of the invention (See FIG. 3), the method for the second operation (Path B) further properly orients the checks at 26, encodes, endorses and prints an audit trail for them at 28 and readies them for sending to a bank at 30.

Referring again to FIG. 1, for the first operation (Path A) the system automatically reads, at 21, the information from the image of the document, regardless of what orientation the document has, which can be either front and up-side down, front and right-side up, back and up-side down, back and right-side up. The system automatically reads the document by either using optical character recognition (OCR) to read an optical character scanline or a magnetic ink codeline or can use magnetic image character recognition (MICR) to read the magnetic ink codeline. Alternatively, the system can use software based digital image reading programs to read the document. It should be noted that if the information is automatically read, the documents may not have to be automatically oriented. Any document that the system can not read is rejected and either sent through the system again or sent to an image keyer for manual data entry. If the system does not have the capability to read all of the required document information, such as an amount, an account number field or individual characters within the required field or fields, an image of the information is sent to an operator, also called an image keyer, for manual data entry.

For checks, the system can use MICR and/or OCR to automatically read each check's magnetic ink codeline. Typically, MICR can read about 98% or more of the documents correctly on the first pass if the document is properly oriented. In some systems, the checks' amount field, called the courtesy amount, is read from a digital image of the check using courtesy amount recognition (CAR) and image character recognition (ICR). Legal Amount Recognition (LAR) can also be used to digitally read the legal amount line on a check. In other systems without image-based automatic amount recognition, images are presented to human keyers for data entry.

If an image of a document is automatically oriented, as shown in FIG. 2, the image can then be read, at 20, manually or automatically. If the image is to be manually read, the image is displayed to an image keyer who reads each document and enters the required information from the document. The image keyer may also enter the data for any document that was previously rejected from the process. To assist the image keyer, the image of the document is oriented and shown on a readable display, such as a computer monitor. For checks, the image keyer can enter the courtesy amount after viewing the image of the courtesy amount field if necessary. The image keyer can then reconcile all transactions that are out of balance following the manual verification and takes care of transactions requiring special handling.

To finish the first operation, the image keyer transmits the data, at 22, to a posting system. The posting system can be a host system to which the collected data is transferred for further processing. Many systems retain the data in storage and transmit the data to a posting system at a later time. Thus, the data need not be sent to a posting system before the documents are physically sorted.

For the second operation (Path B), the system first sorts, at 24, the documents at transport speed to one of four pockets based upon the orientation of the document: face forward and right-side up, face forward and up-side down, back forward and right-side up, or back forward and up-side down. When the documents include checks and coupons (See FIG. 3), the coupons, regardless of orientation, are preferably sorted, at 24, into a pocket separate from the checks. Sorting the checks from the coupons, however, may possibly be done at a later time.

Referring to FIG. 2, the method for reading and sorting documents 10', can further include automatically orienting the captured digital images of each document, at 18, based upon its previously determined orientation. The digital images of each document can be stored in a properly oriented form. Alternatively, the data record for each image could store one or two flags that indicate the orientation of each document. Upon display of the documents' images, each document can be automatically flipped or rotated to the proper orientation. Once properly oriented, the information is then read, at 20, from the document. The information can then either be read automatically as discussed above, or can be read manually by an operator on a computer monitor.

Referring to FIG. 3, the method for reading and sorting documents 10" can be used for the processing of checks and coupons that are sent in the same envelope. For the processing of checks, the next step after staging the documents, at 11, includes preparing the documents for image-based transport capture which includes creating control documents, at 12, such as batch headers and batch trailers. The control documents are added to the transactions that were previously extracted from the envelopes. With some previous methods, only one batch header and one batch trailer were required for each batch. With the present method, additional batch headers and batch trailers may be required for each batch. Batch trailers, however, may not be necessary. Because each batch of checks will be later sorted into four different pockets based upon check orientation, four batch headers and four batch trailers are required for each batch. As with previous methods, the batch header has a unique batch number. It is desirable, however, that this unique number be printed in at least four locations on the batch header such that it can be machine read in all four possible orientations.

Still referring to FIG. 3, for the second operation (Path B) after the system determines the orientation of each document, the system separates the checks from the coupons and then sorts the checks. The system sorts the checks, at 24, at transport speed to one of four pockets based upon the orientation of the check: face forward and right-side up, face forward and upside down, back forward and right-side up, or back forward and up-side down. The coupons, regardless of orientation, are preferably sorted, at 24, into a pocket separate from the checks.

The checks are physically oriented by an operator before the encode pass. The step of physically orienting the checks, at 26, will be different depending on whether or not the batch headers and batch trailers are unique and readable in all four possible orientations, or whether or not a batch trailer exists. Depending on their orientation, an operator manually takes the checks and orients them along with the batch header and the trailer, if one exists, such that the batch documents can be read when the checks are in the proper orientation. Following this processing, the batch headers and batch trailers may be sorted and reused at another time.

Next, the system can transport each pocket of checks through the encode pass. The system, at 28, encodes the correct dollar amount on the checks, endorses them, and prints an audit trail for the checks. Some systems may perform the steps of encoding, endorsing and audit trail printing in different orders. Audit trails may also be printed on other documents such as the batch or control documents.

After the encode pass, the checks will have been encoded and properly oriented. For a non-bank operation or a bank with a check processing operation in a different location cash letters are prepared, at 30, and the encoded checks are sent to the appropriate bank or banks. For banks with remittance/lockbox processing operations physically close to the check processing operation, cash letters are not prepared. Rather, the remittance/lockbox operation forward the checks to the check processing operation where cash letters are subsequently prepared. A key capability is to process checks through the encode pass in reverse order for back forward and right-side up, and back forward and up-side down checks. Additionally and optionally, a key capability is to process checks through the encode pass in any order within the batch.

The methods for reading and sorting documents 10, 10', 10" herein relate to documents, not only checks. Therefore the method need not include the steps specific to checks, such as the part of the second operation (Path B) shown only in FIG. 3, which includes physically sorting 24, orienting 26, processing 28 and sending the checks to a bank 30.

Figure 4:
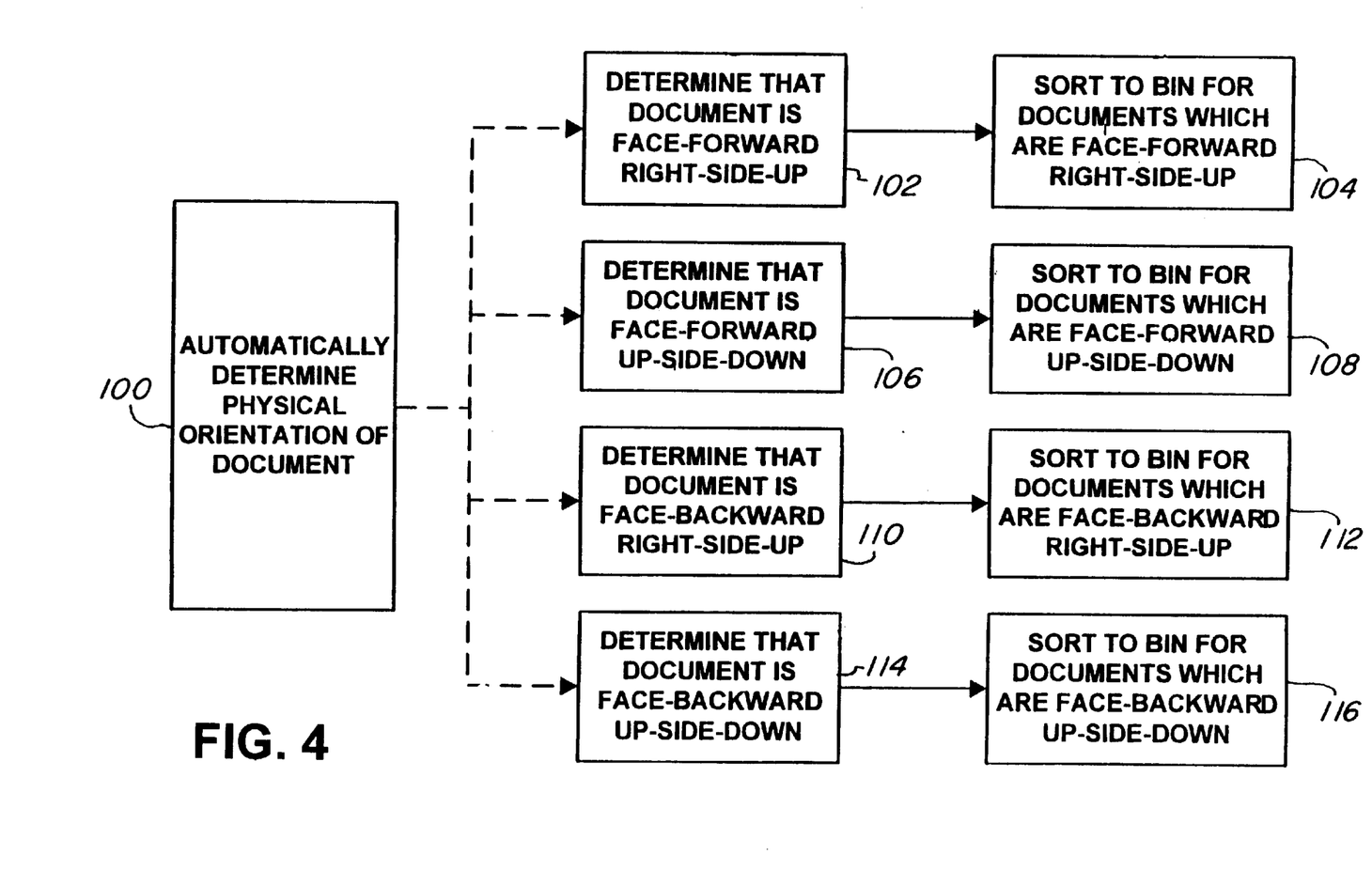
FIG. 4 is a flowchart illustrating in greater detail the step of sorting documents by orientation of the methods of FIGS. 1–3.

Referring now to FIG. 4, the step of sorting documents by orientation is shown in greater detail. The system automatically determines the physical orientation of each document at 100. Each document may have one of the following four orientations: face-forward and right-side-up, face-forward and up-side-down, face-backward and right-side-up or face-backward and upside-down. Once the physical orientation of the document is determined, the document is passed to a bin corresponding to the determined orientation without physical reorientation of each document taking place. Thus, if the document is determined to be face-forward and right-side-up, at 102, that document is sorted, at 104, to a first bin for documents which are face-forward and right-side-up. Similarly, if the document is determined to be face-forward and up-side-down, at 106, that document is sorted, at 108, to a second bin for documents which are face-forward and up-side-down, if the document is determined to be face-backward and right-side-up, at 110, that document is sorted, at 112, to a third bin for documents which are face-backward and right-side-up, and if the document is determined to be face-backward and upside-down, at 114, that document is sorted, at 116, to a fourth bin for documents which are face-backward and up-side-down.

This provides a benefit over the prior art in that physical reorientation of each document is not necessary, which physical reorientation requires machinery which is expensive, complex and difficult to maintain. Instead, documents are sorted to one of four appropriate bins. After a number of documents have been sorted, the stack of documents in each bin can then be reoriented, either manually or automatically, all at once.

Figure 5:
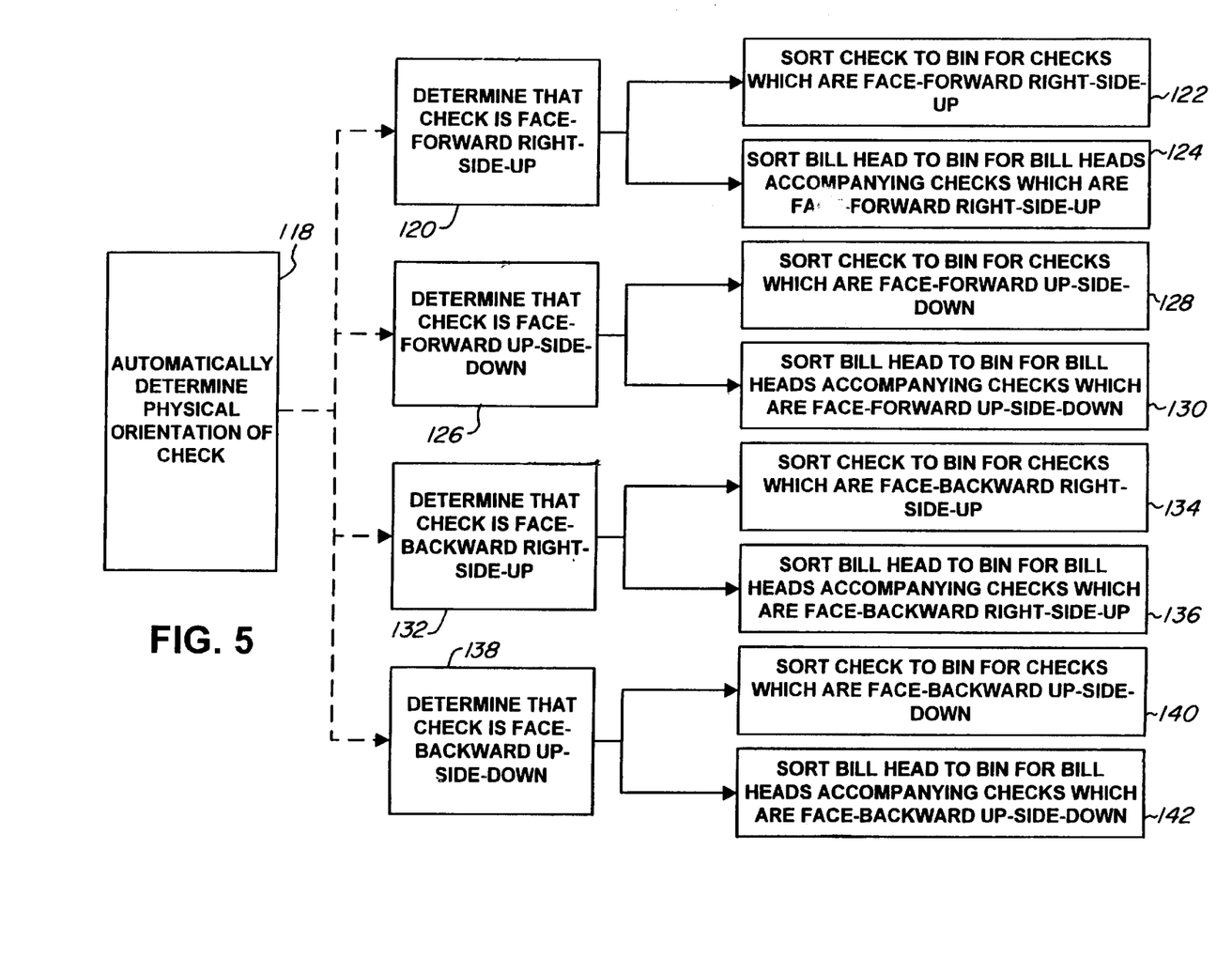
FIG. 5 is a flowchart illustrating in greater detail the step of sorting documents by orientation of the method of FIG. 3, showing the case where the documents include checks and coupons (i.e., bill heads)

Referring now to FIG. 5, the step of sorting documents containing a check and bill head (i.e., coupon, invoice, payment slip, etc.) is shown in greater detail. The system automatically determines the physical orientation of the check at 118. It should be noted that the orientation of the bill head may not correspond to the orientation of the check. However, as the check is typically the portion of the transaction subject to further physical manipulation and processes, the orientation of the check is of concern, while typically, orientation of the bill head is not of concern. However, situations may exist where orientation of the bill head is of concern, in which case one skilled in the art can make obvious modifications to the system described herein to incorporate bill head sorting according to orientation of the bill head independently of the check.

Each check may have one of the following four orientations: face-forward and right-side-up, face-forward and up-side-down, face-backward and right-side-up or face-backward and up-side-down. Once the physical orientation of the check is determined, the check is passed to a bin corresponding to the determined orientation without physical reorientation of each check taking place. Also, the bill head accompanying the check is passed to a bin also corresponding to the determined orientation of the check. Thus, if the check is determined to be face-forward and right-side-up, at 120, that check is sorted, at 122, to a first bin for checks which are face-forward and right-side-up. At the same time, the bill head accompanying the check is sorted, at 124, to a second bin for bill heads accompanying checks which are face-forward and right-side-up. Similarly, if the check is determined to be face-forward and up-side-down, at 126, that check is sorted, at 128, to a third bin for checks which are face-forward and up-side-down and the bill head accompanying the check is sorted, at 130, to a fourth bin for bill heads accompanying checks which are face-forward and up-side-down. If the check is determined to be face-backward and right-side-up, at 132, that check is sorted, at 134, to a fifth bin for checks which are face-backward and right-side-up and the bill head accompanying the check is sorted, at 136, to a sixth bin for bill heads accompanying checks which are face-backward and right-side-up. Finally, if the check is determined to be face-backward and up-side-down, at 138, that check is sorted, at 140, to a seventh bin for checks which are face-backward and up-side-down and the bill head accompanying the check is sorted, at 142, to an eighth bin for bill heads accompanying checks which are face-backward and up-side-down.

Figure 6:
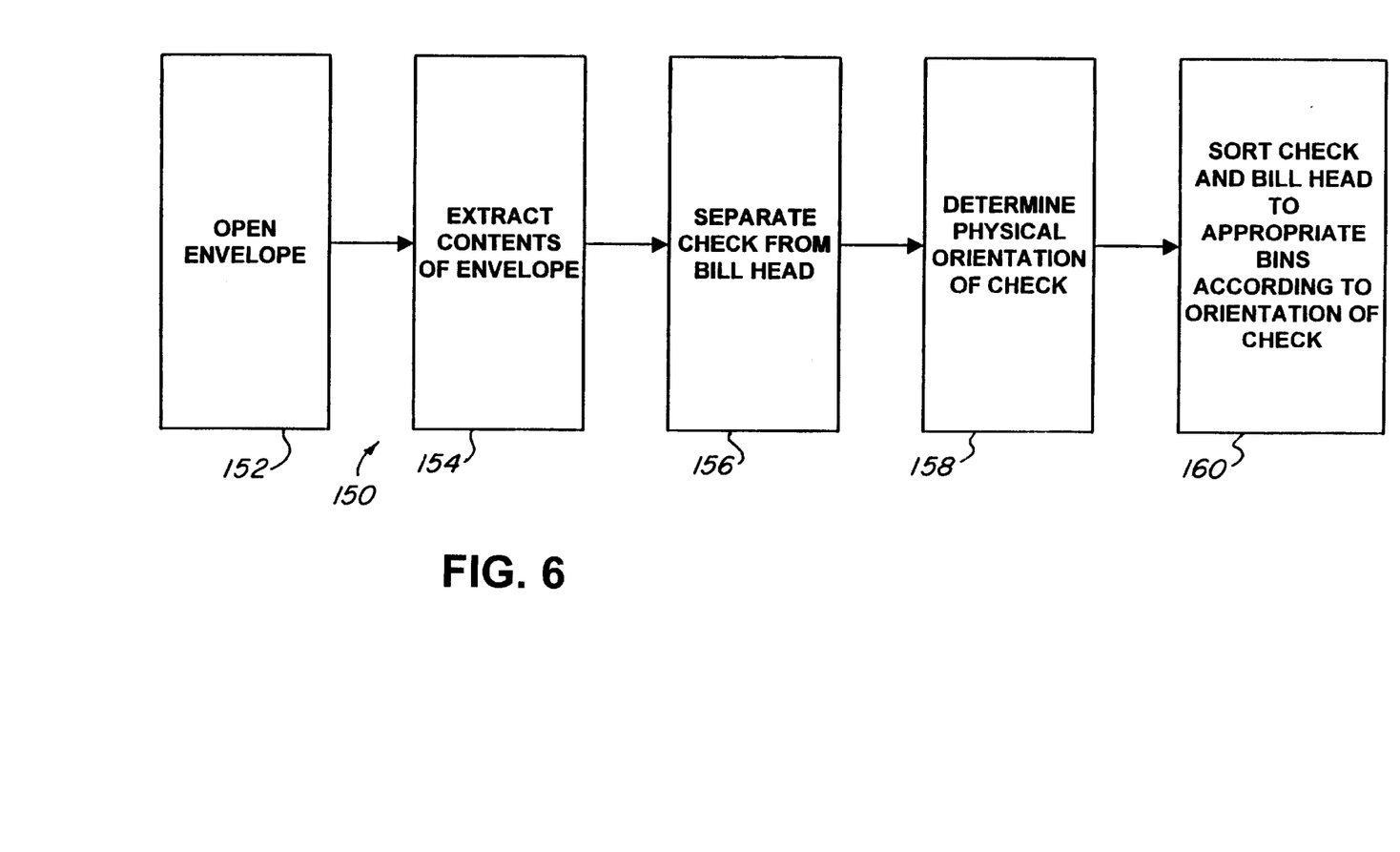
FIG. 6 is a flowchart illustrating an overall document processing system incorporating the method for reading and sorting documents in accordance with the present invention.

Referring now to FIG. 6, the above-described method for sorting checks and bill heads is particularly well suited for incorporation into an automated system 150 for processing such checks and bill heads. Preferably, substantially all processes are fully automated. At 152, system 150 opens each envelope along at least one edge to provide access to the contents of the envelope. The opener used for this step may take any of numerous forms, and many types and designs of openers which are known and are commercially available may be used, so long as the opener opens at least one edge of envelopes fed into system 150. As such, the opener and the operation thereof is not described in detail herein. The opener may include a feeder which stores enveloped to be fed, and which automatically feeds envelopes as required. Preferably, milling (often called chipping) cutters are used in this application because their cutting action is less likely to cut into folded contents of an envelope when compared to devices which employ slicing, slitting, chopping, bursting, abrasives, lasers, citric acid and/or heat, although any of these later described methods may also be used.

After the opening process has been completed the envelopes are transported to an extractor. The extractor, at 154, extracts the contents of the envelope (i.e., the check and the bill head) therefrom. This process is also known as separation. Numerous extractors (or separators) which are known in the prior art and which are commercially available may be used with system 150. As such, the extractor is not described fully herein. One example of such an extractor is commercially available from Agissar Corporation of Stratford, Connecticut, assignee of the present patent application, under the trademark Vac Track.

Once the check and the bill head are extracted from the envelope, they are passed to a singulator. The singulator, at 156, physically separates the check from the bill head so that they do not interfere with each other during subsequent processing. This process is known as singulation. Numerous singulators which are known in the prior art and which are commercially available may be used with system 150. As such, the singulator is not described fully herein.

Next, the physical orientation of the check is determined at 158. As discussed above, each check may have one of the following four orientations: face-forward and right-side-up, face-forward and up-side-down, face-backward and right-side-up or face-backward and up-side-down. Once the physical orientation of the check is determined, the check is passed, at 160, to a bin corresponding to the determined check orientation without physical reorientation of each check taking place. Also at 160, the bill head accompanying the check is passed to a bin also corresponding to the determined orientation of the check. This process is described more fully above with reference to FIG. 5.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method for sorting documents comprising the steps of:
    automatically determining the physical orientation of each document, the physical orientation of each document selected from the group comprising face-forward and right-side-up, face-forward and up-side-down, face-backward and right-side-up and face-backward and up-side-down;
    automatically sorting each document by orientation to a document bin selected from the group comprising bin for documents which are face-forward and right-side-up, bin for documents which are face-forward and up-side-down, bin for documents which are face-backward and right-side-up and bin for documents which are face-backward and up-side-down;
    capturing a digital image of each document; and
    automatically orienting the digital image of each document from a position selected from the group comprising face-forward and right-side-up, face-forward and up-side-down, face-backward and right-side-up and face-backward and up-side-down to a preferred orientation.

2. The method of claim 1 wherein each document includes visually readable markings, and wherein the physical orientation of each document is automatically determined based upon the visually readable markings.

3. The method of claim 1 wherein each document includes magnetically readable markings, and wherein the physical orientation of each document is automatically determined based upon the magnetically readable markings.

4. A method for sorting checks and accompanying bill heads comprising the steps of:
    automatically determining the physical orientation of each check, the physical orientation of each check selected from the group comprising face-forward and right-side-up, face-forward and up-side-down, face-backward and right-side-up and face-backward and up-side-down;
    automatically sorting each check by orientation to a check bin selected from the group comprising bin for checks which are face-forward and right-side-up, bin for checks which are face-forward and up-side-down, bin for checks which are face-backward and right-side-up and bin for checks which are face-backward and up-side-down;
    automatically sorting each bill head by orientation of the check which it accompanies to a bill head bin selected from the group comprising bin for bill heads accompanying checks which are face-forward and right-side-up, bin for bill heads accompanying checks which are face-forward and up-side-down, bin for bill heads accompanying checks which are face-backward and right-side-up and bin for bill heads accompanying checks which are face-backward and up-side-down;

capturing a digital image of each check and accompanying bill head; and automatically orienting the digital image of each check and accompanying bill head from a position selected from the group comprising face-forward and right-side-up, face-forward and up-side-down, face-backward and right-side-up, and face-backward and up-side-down to a preferred orientation.

5. The method of claim 4 wherein each check includes visually readable markings, and wherein the physical orientation of each check is automatically determined based upon the visually readable markings.

6. The method of claim 4 wherein each check includes magnetically readable markings, and wherein the physical orientation of each check is automatically determined based upon the magnetically readable markings.

7. A method for automatically processing mail, the mail comprising an envelope with a document therein, the method comprising the steps of:

automatically opening the envelope along at least one edge to provide access to the document;

automatically extracting the document from the envelope;

automatically determining the physical orientation of the document, the physical orientation of the document selected from the group comprising face-forward and right-side-up, face-forward and up-side-down, face-backward and right-side-up and face-backward and up-side-down;

automatically sorting the document by orientation to a document bin selected from the group comprising bin for documents which are face-forward and right-side-up, bin for documents which are face-forward and up-side-down, bin for documents which are face-backward and right-side-up and bin for documents which are face-backward and up-side-down;

capturing a digital image of the document; and automatically orienting the digital image of the document from a position selected from the group comprising face-forward and right-side-up, face-forward and up-side-down, face-backward and right-side-up and face-backward and up-side-down to a preferred orientation.

8. The method of claim 7 wherein the document includes visually readable markings, and wherein the physical orientation of the document is automatically determined based upon the visually readable markings.

9. The method of claim 7 wherein the document includes magnetically readable markings, and wherein the physical orientation of the document is automatically determined based upon the magnetically readable markings.

10. A method for processing mail, the mail comprising an envelope having a check and an accompanying bill head therein, the method comprising the steps of:

automatically opening the envelope along at least one edge to provide access to the check and bill head;

automatically extracting the check and bill head from the envelope;

automatically singulating the check from the bill head;

automatically determining the physical orientation of the check, the physical orientation of the check selected from the group comprising face-forward and right-side-up, face-forward and up-side-down, face-backward and right-side-up and face-backward and up-side-down;

automatically sorting the check by orientation to a check bin selected from the group comprising bin for checks which are face-forward and right-side-up, bin for checks which are face-forward and up-side-down, bin for checks which are face-backward and right-side-up and bin for checks which are face-backward and up-side-down;

automatically sorting the bill head by orientation of the check which it accompanies to a bill head bin selected from the group comprising bin for bill heads accompanying checks which are face-forward and right-side-up, bin for bill heads accompanying checks which are face-forward and up-side-down, bin for bill heads accompanying checks which are face-backward and right-side-up and bin for bill heads accompanying checks which are face-backward and up-side-down;

capturing a digital image of the check and accompanying bill head; and automatically orienting the digital image of each check and accompanying bill head from a position selected from the group comprising face-forward and right-side-up, face-forward and up-side-down, face-backward and right-side-up, and face-backward and up-side-down to a preferred orientation.

11. The method of claim 10 wherein the check includes visually readable markings, and wherein the physical orientation of the check is automatically determined based upon the visually readable markings.

12. The method of claim 10 wherein the check includes magnetically readable markings, and wherein the physical orientation of the check is magnetically readable markings.

* * * * *